June 22, 1965
H. W. ROCKWELL
3,190,017
SCRAPER CONTROL SYSTEM WITH MEANS TO LOCK FLUID
IN ONE END OF THE BOWL RAISING MOTOR
Filed Dec. 3, 1962
3 Sheets-Sheet 1
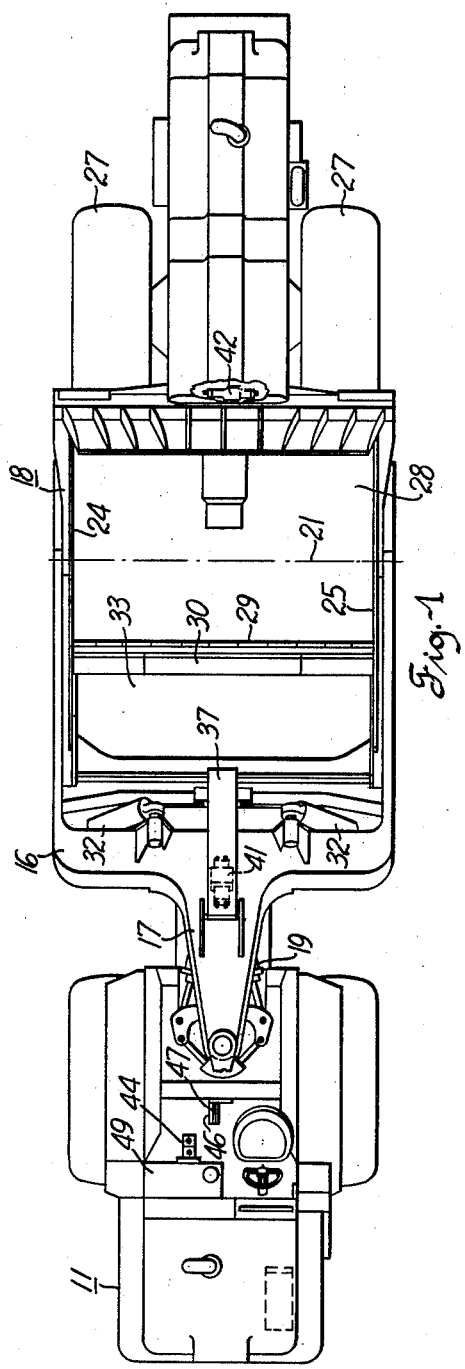
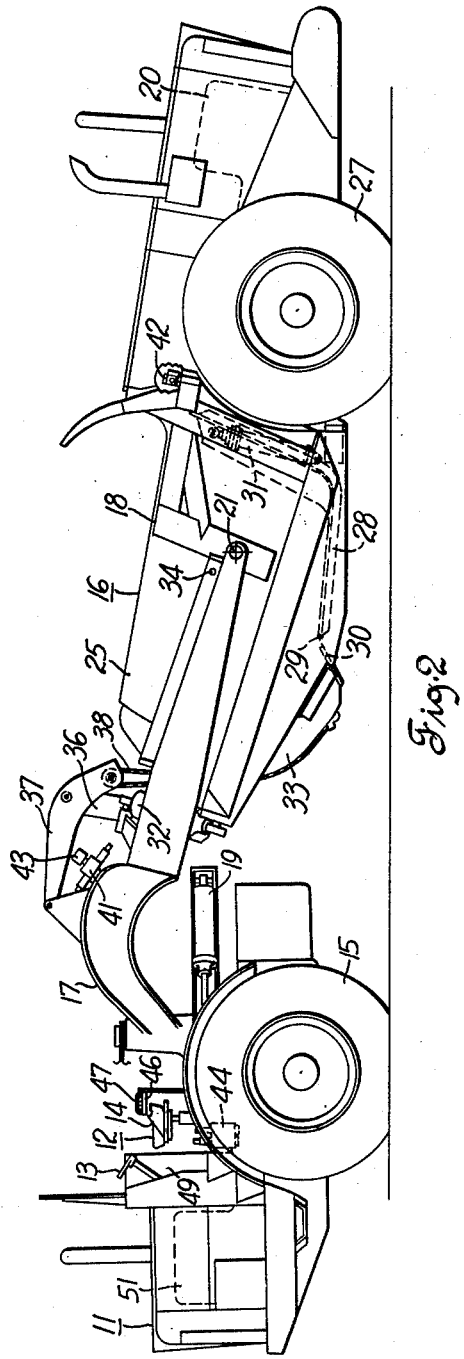
Inventor
Harvey W. Rockwell
By Charles L. Schwab
Attorney Inventor
Harvey W. Rockwell
By Charles L. Schmut
Attorney

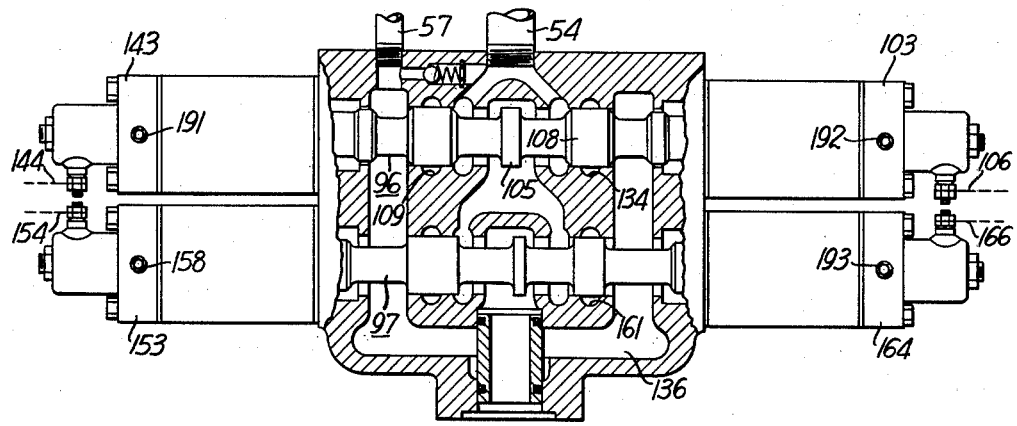
Fig. 4
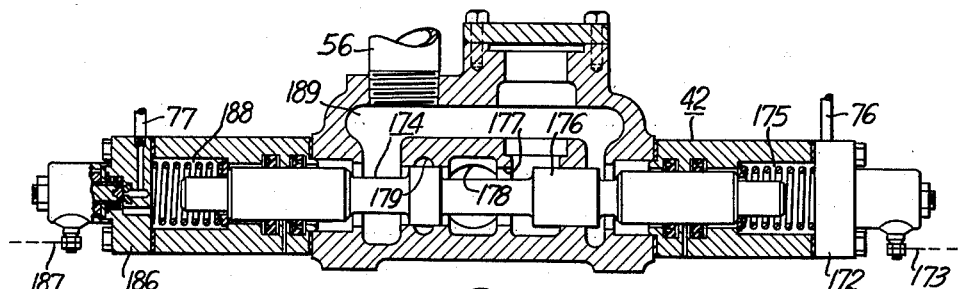
Fig. 5
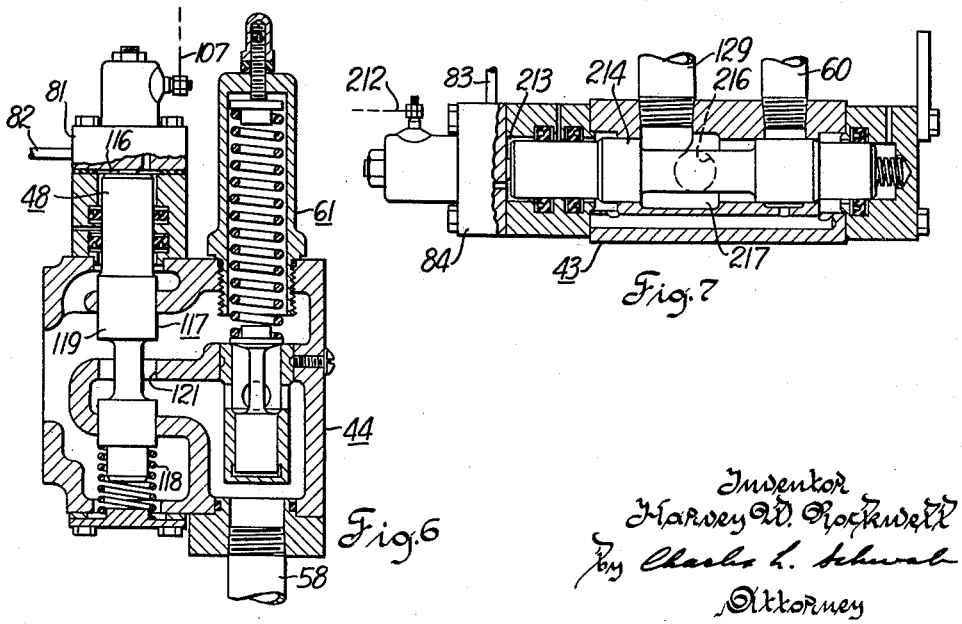
Fig. 6
Fig. 7
Inventor
Harvey W. Rockwell
By Charles L. Schwab
Attorney United States Patent Office 3,190,017
Patented June 22, 1965

3,190,017
SCRAPER CONTROL SYSTEM WITH MEANS TO LOCK FLUID IN ONE END OF THE BOWL RAISING MOTOR
Harvey W. Rockwell, Cedar Rapids, Iowa, assignor to Allis-Chalmers Manufacturing Company, Milwaukee, Wis.
Filed Dec. 3, 1962, Ser. No. 241,877
3 Claims. (Cl. 37—129)

This invention relates to a control system for material handling equipment such as earth movers. More particularly, this invention relates to a remote control system for hydraulic motors which operate various material handling components of an earth mover or the like.

In operating motor scrapers down extremely steep inclines, it is not possible to adequately brake the motor scraper by the wheel brakes and drive train retarder commonly provided in motor scrapers. To provide sufficient downhill braking in such conditions, the operator lowers the bowl of the scraper until it drags on the ground thus providing the needed braking. In scrapers using double acting bowl control jacks, the bowl is lowered until sufficient drag is effected then the control valve is placed in hold thereby locking the fluid in the opposite ends of the bowl jacks. In this condition, operational difficulties arise when, for instance, the downhill contour is such that the bowl high centers thereby materially reducing the force exerted by the front tractor wheels on the ground. In such a condition, the operator loses steering control of the vehicle and a dangerous operational condition exists. Further, since in using such prior art construction the operator must raise and lower the bowl during descent of the steep incline in order to maintain appropriate ground contact with the bowl cutting edge, and thus provide braking without losing control of the motor scraper, the descent is slower than desired. This invention is concerned with improving the operation of the motor scraper through provision of means for selectively permitting a floating action of the motor scraper bowl, particularly during steep descent operations.

Also, a floating bowl has been found to provide more efficient loading of certain types of soils, thus providing an additional advantage.

It is an object of this invention to provide an improved control system for an earth mover.

It is a further object of this invention to provide an improved remote control system in an earth mover wherein the control valves are located near the hydraulic motors they control.

It is a further object of this invention to provide a scraper control system which has simplified hydraulic circuits, has quick response to operator control, and selectively permits the bowl to floatingly ride on the ground.

It is a further object of this invention to provide an electrically controlled scraper control system for remotely located hydraulic valves including a float valve for selectively permitting both ends of the double acting bowl operating motor to be connected to the low pressure side of the hydraulic system.

It is a further object of this invention to provide an improved hydraulic control system for an earth mover wherein an electric over air control arrangement is employed to operate hydraulic valves located remote from the operator station and wherein a float valve is employed to selectively permit a floating operation of the scraper bowl.

These and other objects of this invention will be apparent when the following description is read in conjunction with the drawings in which:

FIG. 1 is a top view of an earth mover in which the present invention is utilized;

FIG. 2 is a side view of the earth mover illustrated in FIG. 1;

FIG. 4 is a section view of the bowl and apron control valves;

FIG. 5 is a section view of the ejector control valve;

FIG. 6 is a section view of the diverter and relief valves; and

FIG. 7 is a section view of the float valve.

Figure 3:
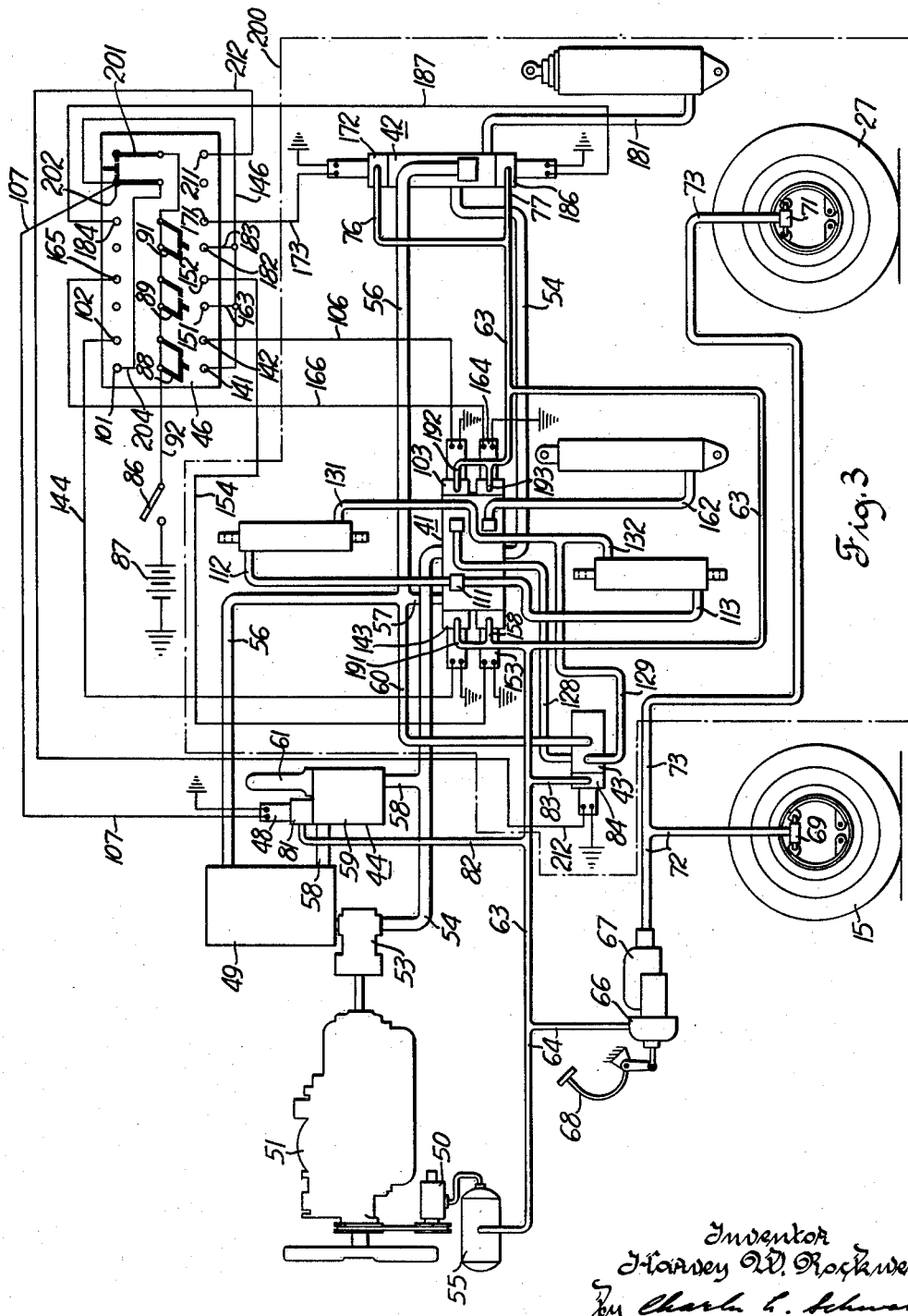
FIG. 3 is a schematic showing of the control system of this invention.

Referring to FIGS. 1 and 2, the earth mover is made up of a front tractor unit 11 and a motorized trailer unit 16. The front tractor unit includes an engine 51 driving front wheels 15 and an operator station 12 at which a steering wheel 13 and operator seat 14 are located. The trailer unit 16 includes a yoke 17 which is pivotally connected to the front tractor unit by hitch means permitting horizontal swinging movement of the front tractor unit 11 about a vertical axis and lateral oscillating movement of the front tractor unit relative to the yoke 17. Steering of the front tractor unit relative to the yoke 17 about a vertical pivot axis is accomplished by steering means 19. The trailer unit 16 also includes a bowl structure 18 pivotally connected to the yoke 17 on a transverse axis 21. The bowl structure 18 includes a transverse blade structure 30, side walls 24, 25 and rear driving wheels 27 driven by the rear engine 20.

Material is ejected from the earth mover bowl structure by actuation of an ejector motor in the form of a single acting jack 31 to thereby pivot the bottom 28 about its pivot connection 29 with blade structure 30. The jack 31 is pivoted at its bottom end to a transverse frame member of bowl structure 18 and is pivoted at its top end to the pivoted bottom 28. The bowl structure 18 is raised and lowered by a pair of double acting hydraulic motors in the form of bowl control jacks 32 which are pivotally connected at their lower rod ends to the forward end of side walls 24, 25, and are pivotally connected at their upper ends to the yoke 17. The apron 33 is pivotally connected to the side walls 24, 25 for pivotal movement about a transverse axis 34. The apron is pivoted about axis 34 by a single acting apron control motor in the form of a jack 36 pivoted at its lower end to the yoke and at its upper end to a lever 37 which carries a sheave about which an apron control cable 38 is reeved. Control valve assembly 41, containing a pilot operated bowl control valve and a pilot operated apron control valve, is mounted on the yoke in close proximity to the jacks 32, 36 which are controlled thereby. Ejector control valve assembly 42 is mounted on the bowl structure 18 in close proximity to the ejector jack 31. A float valve assembly 43 is mounted on the valve assembly 41 and a diverter and relief valve assembly 44 is mounted on a hydraulic reservoir 49 carried by the tractor unit 11.

The control valve assemblies are pilot operated by an electric over air system. The manually operated electric control switches which are mounted on a terminal block 46 at the operator's station 12 includes a handle 47 permitting the operator to steady his hand during operation of the switches with his thumb or fingers.

Referring to FIG. 3, schematically showing the electric over air over hydraulic control system, the engine 51 of the front tractor unit drives a hydraulic pump 53 and an air compressor 50 the latter of which supplies compressed air to an air storage tank 55. The hydraulic pump 53 draws fluid from the hydraulic reservoir 49 and supplies pressure fluid to the high pressure side of the system which includes a fluid supply passage 54 passing through the bowl and apron control valve assembly 41 and to the ejector valve assembly 42. The low pressure side of the hydraulic system includes a return passage 56 which connects valve assembly 42 to the reservoir 49, a branch passage 57 connected to valve assembly 41 and an auxiliary passage 60 which connects float valve assembly 43 with return passage 56.

A bypass passage 58 is connected at one end to the reservoir 49 and at its other end to the supply passage 54 intermediate the pump 53 and the control valve assemblies 41, 42. The housing 59 of diverter and relief valve assembly 44 houses a diverter valve 48 and a relief valve 61 which are hydraulically in parallel in the bypass passage 58.

The control valves of this control system are pilot operated by compressed air controlled by electrically operated air valves. An air conduit 64 supplies compressed air to a pneumatic actuator 66 employed to assist in operation of the piston in the master cylinder 67 of the earth mover braking system. Upon depressing brake pedal 68, air is admitted to the actuator 66 which assists in moving the piston of the master cylinder 67 to deliver high pressure brake fluid through conduits 72, 73 to the wheel cylinders 69, 71. Compressed air is supplied to the earth mover control system by conduit 63 which is connected to brake supply conduit 64. Branch conduits 76, 77 connect air passage 63 to air valves 172, 186 at opposite ends of valve assembly 42. Branch conduits 158, 191, 192, 193 connect conduit 63 to air valves at opposite ends of the two spools of valve assembly 41. Air conduit 82 connects conduit 63 to an air valve 81 of diverter valve 48 and air conduit 83 connects conduit 63 with an air valve 84 of float valve assembly 43. The electrical control system for operating the electrically controlled air valves is connected to the earth mover electrical system through a switch 86. The electrical power source is illustrated as a battery 87.

Terminal block 46 which is mounted at the operator's station, as illustrated in FIGS. 1 and 2, mounts four manually actuated control members in the form of double throw, double pole switches 88, 89, 91, 201 each of which is connected to the electrical power source by supply lead 92. Each of the switches 88, 89 and 91 has a neutral position in which it does not energize any air valve. Switch 201 is a two position switch having no neutral position.

*Raising and lowering the bowl*

When the operator wishes to raise the bowl, he moves switch 88 downwardly, as viewed in FIG. 3, thereby engaging contacts 141, 142 to energize air valve 103 of valve assembly 41 through lead 106 and to energize air valve 81 through leads 146, 107 thereby closing diverter valve 44. Referring also to FIG. 4, when air valve 103 is energized air pressure is admitted through conduit 192 to the end of bowl control valve spool 96 thus moving it to the left to a bowl raising position in which: lands 105, 108 block the flow of pressure fluid through open center valve spool 96, port 109 is connected to supply passage 54 and port 134 is connected to reservoir 49 through cavity 136 and branch return passage 57. Port 109 supplies the lower rod ends of jacks 32 through motor passages in the form of hoses 112, 113 connected to port 109 by a T 111. Passage means including hoses 128, 129, 131, 132 connects port 134 to the upper ends of jacks 32.

When it is desired to lower the bowl to forcefully cause blade structure 30 to penetrate the ground, the operator moves switch 88 upwardly, as shown in FIG. 3, to engage contacts 101, 102, thereby energizing air valve 143 through lead 144 and energizing air valve 81, assuming switch 201 is in its bowl down pressure position as illustrated in FIG. 3, in which contact 202 is engaged thus connecting lead 107 to the electrical power source through lead 204. Referring to FIG. 6 air valve 81 upon being energized admits pressurized air to chamber 116 at the upper end of diverter valve spool 117. The air pressure rises rapidly in chamber 116 moving spool 117 downwardly against the biasing effect of spring 118 to close port 121 by land 119. Thus upon moving the switch 88 to bowl raise position, the diverter valve will automatically be moved from its open position to its closed position and air pressure admitted to the left end of valve spool 96, as viewed in FIG. 4, through conduit 191, will quickly move the spool 96 to the right to connect the lower ends of the jacks 32 to the supply passage 54 and the upper ends of the jacks to the reservoir 49. Similarly, diverter valve 48 will be quickly closed upon movement of switch 88 to its bowl lower position provided switch 201 is in its bowl down pressure position as shown in FIG. 3.

*Floating bowl operation*

The auxiliary or float valve 43 is provided to permit a floating operation of the bowl. That is, the bowl cutting edge is allowed to ride or penetrate the ground under the gravity loading of the bowl. In this floating condition both ends of the jacks 32 are connected to the reservoir return passage 56. The operator achieves this condition by moving switch 88 upwardly, as viewed in FIG. 3, to its bowl lower position and by moving the two position float valve control switch 201 downwardly as viewed in FIG. 3 to its bowl float position in which terminal 211 is engaged. With switches 88 and 201 thus positioned, the spool 96 of the bowl control valve will be moved to the right, as viewed in FIG. 4, placing port 109 and the lower rod ends of jacks 32 in communication with reservoir branch passage 57. The supply passage 54 in the lowering position of bowl control valve spool 96, is connected to hose 128 through port 134. In the bowl float position of switch 201, the down position as viewed in FIG. 3, electrically operated air valve 84 is energized through current flow in lead 212. Referring to FIG. 7, when air valve 84 is energized air chamber 213 is connected to air pressure conduit 83 and the float control valve spool 214 is moved to the right to an open position thereby opening auxiliary branch passage 60 and placing hoses 128, 129 in free fluid communication with the reservoir. Port 216, which opens into chamber 217 in the housing 218 of float control valve assembly 43, is connected to passage 128. The chamber 213 and associated end of valve spool 214 constitute air powered means or actuator means for operating the valve spool. When the bowl is placed in a floating condition, by moving switch 88 to its bowl lower position and switch 201 to its bowl float position, the diverter valve remains open thus reducing the biasing effect of the pump output on jacks 32. In the floating condition of the bowl, the scraper blade structure will engage the ground under gravity loading thus permitting the motor scraper to drag bottom in steep descents without loss of steering control. Also in excavating some types of soils, the loading is improved by using a floating bowl. In such soils, the combined gravity and draft forces, in bowl float condition, places the right amount of bias on the cutting edge of the blade structure to produce the most efficient excavating depth.

*Semifloat operation of bowl jacks*

In some earth mover operations it is desired to prevent the cutting edge from moving below a ground engaging position to which it is lowered, and still permit the cutting edge to float upwardly. In prior art scrapers using single acting bowl lift jacks, upward floating movement is resisted by a vacuum drawn in the fluid locked end of the jacks. The control system of FIG. 3 is used to condition the double acting bowl jacks 32 to act the same as single acting jacks would act in a hold position of the latter. This semifloat condition is achieved by placing switch 88 in neutral and switch 201 in bowl float position, wherein terminal 211 is contacted. In this condition of the control system the bowl control valve spool 96 is in its hold position, as illustrated in FIG. 4, and the float control valve spool 214 is moved to its open position thereby placing the upper ends of the jacks 32 in communication with the reservoir 49. Thus fluid is locked in the lower end (rod end) of the bowl jacks 32 and fluid in the upper ends of the jacks is in free flow communication with the reservoir. During excavating operations in ground having alternately soft and hard spots, the fluid locked in the lower ends of the bowl jacks 32 will prevent the bowl from sucking in too deep in the soft spots and the bowl will float up in traversing the hard spots, this being permitted by drawing a partial vacuum in the lower end of the jacks 32. This semifloating operation of jacks 32 insures that the rear driving wheels 27 remain on the ground to assist in loading when the blade 30 tends to ride up on hard material being excavated. If, for instance, the jacks 32 are in a hold condition, the fluid will be blocked in both ends thereby causing the bowl blade 30 to ride up on hard spots which will result in taking weight off the rear wheels with attendant loss of traction.

The semifloat operation of the bowl jacks 32 is also functionally advantageous in steep descent operations where the grade and soil conditions are not constant. It has been found that descent can be made considerably faster, yet safely, in semifloat operation of the bowl jacks 32 as compared with a full float operation or a hold condition of the jacks 32.

The illustrated control system permits the double acting bowl jacks to be operated to achieve bowl raising, bowl lowering, bowl hold, bowl float and bowl semifloat. Thus the operator has the double acting jack function available to power down on the cutting edge to get quick initial penetration during excavation and may optionally cause the double acting bowl jacks to operate as single acting jacks to provide a semifloat function during the excavating cut. Such a versatile bowl operating control system has not heretofore been provided for earth movers.

*Apron operation*

When it is desired to raise the apron 33, double pole switch 89 is moved downwardly, as shown in FIG. 3, to engage contacts 151, 152 thereby energizing air control valves 153, 81 through current flow through leads 154, 163 to effect supply of hydraulic fluid to jack 36 through hose 162 and to effect closing of the bypass passage 58. Upon energizing air control valve 153, air pressure is admitted through conduit 158 to the left end of open center valve spool 97 thus moving it to the right to block flow of pressure fluid through its center and direct pressure fluid to port 161 which is connected to hose 162. The apron is lowered upon the operator moving the double pole switch 89 to the upper position, as shown in FIG. 3, wherein contact 165 is engaged thereby energizing air control valve 164 by current flow through lead 166 thus supplying air pressure through conduit 193 to the end of spool 97 and moving the latter to the left to its lowering position. Referring to FIG. 4, in the lowering position of valve spool 97 port 161 communicates with return to reservoir chamber 136 and valve spool 97 remains open through its center.

*Ejector operation*

The ejector jack 31 is expanded to pivot the bowl bottom about its pivot connection 29 to an ejecting position when double pole switch 91 is moved downwardly, as viewed in FIG. 3, to engage contacts 171, 182. Upon engaging contact 171, current is supplied to solenoid operated air control valve 172 through lead 173 thereby permitting compressed air to enter chamber 175 through air conduit 76. Pressurization of chamber 175 moves the ejector valve spool 174 to the left as viewed in FIG. 5, thereby causing land 176 to close port 177 and place supply port 178 in fluid supplying relation to ejector jack supply port 179 which is in fluid communication with ejector jack supply hose 181. Supply port 178 is connected to supply passage 54. When the switch 91 is moved to the eject position as beforementioned, contact 182 is also engaged causing current to flow through lead 183 to actuate air valve 81 which effects closing of the diverter valve 48.

When it is desired to contact the ejector jack 31, the double pole switch 91 is moved upwardly, as shown in FIG. 3, to contact terminal 184, thus supplying current to solenoid operated air control valve 186 through lead 187. When solenoid valve 186 is thus energized, the valve is conditioned to place the air supply conduit 77 in communication with air pressure chamber 188 thus causing the valve spool 174, which acts as a piston, to move to the right thereby placing the ejector jack supply port 179 in fluid communication with the return to reservoir chamber 189 which is in free fluid communication with return passage 56.

From the foregoing description, it is seen that the control system of this invention minimizes the hydraulic hose requirements for operating a plurality of hydraulic jacks. The structure shown within the dot-dash lines 200 is mounted on the trailing unit 16 and the remaining portion of the control system is located on the tractor unit 11. Use of the described valve control system permits an electrical portion thereof to have sufficiently low power requirements to permit it to be supplied by conventional earth mover electric supply means. By locating the hydraulic control valves near or adjacent to jacks which they control, the jacks will be subject to hydraulic pressure immediately upon actuation of the appropriate switches thus giving fast response. The pump unloading means, in the form of bypass conduit 58 and diverter valve 48, unloads the pump 53 when pressure fluid is not required to actuate the jacks. This reduces pump wear as well as reducing power consumption. The differential pressure relief valve 61, hydraulically in parallel with diverter valve 48, is brought into operation only when the pressure exceeds a safe operating value for the hydraulic components. The use of open center valves is preferred since even when the diverter valve 48 is open, a low velocity flow will take place through such valves thereby reducing flow inertia. Thus upon actuation of appropriate control switches, the response of the hydraulic jacks will be almost instantaneous. Further, by use of diverter valve 48 and an open center ejector valve 42, fluid may be exhausted from the ejector ram 31 to reservoir not only by way of return to reservoir passage 56, but also by way of bypass passage 58.

The illustrated pilot operated control valves for bowl, apron and ejector can assume only neutral (hold), and two air actuated positions. The utility of the earth mover is increased considerably by employing a float valve 43 by which the operator may selectively place the bowl in a float condition to provide improved supplemental downhill braking and improved excavating efficiency.

Although a single embodiment of this electric over air over hydraulic control system for an earth mover has been illustrated and described, it is not intended to so limit this invention, but rather it is intended that this invention shall include such other embodiments and modifications as are embraced by the appended claims.

Having now particularly described and ascertained the nature of my said invention and the manner in which it is to be performed, I declare that what I claim is:

1. In a self-propelled earth mover of the type having an operator's station, a material handling bowl which is raised from a ground engaging position to a transport position by power means including a hydraulic motor and an apron controlled by a hydraulic actuator, a control system for said hydraulic motor and actuator comprising: a source of pressure fluid including a pump and a reservoir; a fluid supply passage connected to the output side of said pump; a return passage connected to said reservoir; a pair of motor passages connected to said motor; fluid bypass means for selectively connecting said supply passage to said reservoir including a bypass passage and a diverter valve movable from an open position in which said bypass passage is open to a closed position in which said bypass passage is closed; a bowl control valve remote from said operator's station connected to said supply, return and motor passages, said control valve having a hold position in which said motor passages are blocked, a first motor operating position in which said motor raises said bowl and a second motor operating position in which said motor lowers said bowl; an apron operating valve remote from said control station connected hydraulically in series with said control valve and connected to said hydraulic actuator, said operating valve having hold and operating positions; means independent of said control valve for selectively permitting a floating operation of said bowl including an auxiliary passage independent of said diverter valve connecting one of said motor passages to said reservoir and a float valve in said auxiliary passage and remote from said operator's station selectively movable between an open position in which said one passage is in fluid communication with said reservoir and a closed position in which fluid is not permitted to flow through said auxiliary passage; and control means for operating said valves including manually actuated control members at said operator's station, said control means permitting said diverter and float valves to simultaneously be in their open positions and including means automatically closing said diverter valve when said apron operating valve is moved to its operating position, said control system permitting fluid flow through said auxiliary passage and preventing fluid flow through said bypass passage when said float valve is in its open position and said diverter valve is in its closed position thereby permitting said apron actuator to be actuated when said float valve is open.

2. In an earth mover of the type having a bowl which is raised from a ground engaging position to a transport position by power means including a double acting hydraulic jack, a control system for said jack comprising: a control valve for said jack having hold, raise and lower positions; a source of pressure fluid connected to said control valve; a reservoir connected to said control valve; a pair of jack supply passages interconnecting said control valve and opposite ends of said jack, said jack raising said bowl when said control valve is in its raise position thereby supplying one end of said jack with pressure fluid through one of said supply passages and said jack lowering said bowl when said control valve is in its lower position thereby supplying the other end of said jack with pressure fluid through the other of said supply passages, said one end of said jack being selectively connectable to said source of pressure fluid and reservoir only by way of said control valve; an auxiliary passage placing said other end of said jack in fluid communication with said reservoir; flow control means including a shiftable member in said auxiliary passage selectively movable between an open position in which fluid flow is permitted through said auxiliary passage and a closed position in which fluid is not permitted to flow through said auxiliary passage, said auxiliary passage and shiftable member being independent of said source of pressure fluid; and control means for operating said control valve and shiftable member to simultaneously effect a hold position of said control valve and an open position of said shiftable member to effect a semifloat condition of said jack in which said control valve locks the fluid in said one end of said jack and said other end of said jack is connected to said reservoir through said auxiliary passage.

3. In a self-propelled earth mover of the type having an operator's station, a material handling bowl which is raised from a ground engaging position to a transport positon by power means including a hydraulic motor and an apron controlled by a hydraulic actuator, a control system for said hydraulic motor and actuator comprising: a source of pressure fluid including a pump and a reservoir; a fluid supply passage connected to the output side of said pump; a return passage connected to said reservoir; a pair of motor passages connected to said motor; a bowl control valve remote from said operator's station connected to said supply, return and motor passages, said control valve having a hold position in which said motor passages are blocked, a first motor operating position in which said motor raises said bowl and a second motor operating position in which said motor lowers said bowl; an apron operating valve remote from said control station connected hydraulicaly in series with said control valve and connected to said hydraulic actuator, said operating valve having hold and operating positions; means independent of said control valve and supply passage including an auxiliary passage connecting one of said motor passages to said reservoir and a float valve in said auxiliary passage and remote from said operator's station selectively movable between an open position in which said one passage is in fluid communication with said reservoir and a closed position in which fluid is not permitted to flow through said auxiliary passage; and control means for operating said valves including manually actuated control members at said operator's station, said control means permitting said apron operating valve to be in its operating position to effect movement of said apron at the same time said float valve is in its open position and said bowl control valve is in its closed position thereby effecting a semifloat condition of said hydraulic motor.

References Cited by the Examiner
UNITED STATES PATENTS

| | | | |
|---|---|---|---|
| 2,284,413 | 5/42 | Frentzel | 37—126 X |
| 2,778,131 | 1/57 | Herr | 37—144 |
| 3,062,301 | 11/62 | Pomper | 172—4 X |
| 3,089,517 | 5/63 | Ludwig | 137—625.64 |
| 3,110,118 | 11/63 | Lott | 37—129 |

BENJAMIN HERSH, *Primary Examiner.*